United States Patent [19]

Nelson

[11] Patent Number: 4,784,048

[45] Date of Patent: Nov. 15, 1988

[54] FILTER SYSTEM INCORPORATED WITH CAB FOR ORCHARD SPRAYER

[76] Inventor: Robert M. Nelson, 579 Estates Dr., Yuba City, Calif. 95991

[21] Appl. No.: 112,206

[22] Filed: Oct. 22, 1987

[51] Int. Cl.⁴ ............................................. B60H 3/06
[52] U.S. Cl. ..................................... 98/2.11; 55/467; 55/385.2
[58] Field of Search .................... 55/385 A, 316, 467; 98/2.11

[56] References Cited

U.S. PATENT DOCUMENTS

| | | | |
|---|---|---|---|
| 2,537,278 | 1/1951 | Patterson | 98/2.11 |
| 3,657,942 | 4/1972 | Minnick, Jr. | 98/2.11 |
| 4,140,047 | 2/1979 | Bowman et al. | 98/2.11 |
| 4,587,890 | 5/1986 | Hurlburt | 98/2.11 |

FOREIGN PATENT DOCUMENTS

| | | | |
|---|---|---|---|
| 185312 | 10/1983 | Japan | 98/2.11 |
| 1111890 | 9/1984 | U.S.S.R. | 98/2.11 |

Primary Examiner—Harold Joyce
Attorney, Agent, or Firm—Townsend and Townsend

[57] ABSTRACT

An air filtration system is disclosed in combination with a removably attachable enclosed cab for preferred use with an agricultural tractor towing a sprayer through an orchard. The enclosed cab has an air intake from the upward forward portion of the cab. The air intake opens to an intake plenum which passes along the tip of the cab defining a minimum vertical profile over the top of the cab. The air chest is mounted to the upper rear portion of the cab below the cap top and immediately overlying the cab rear window. Air passes down the forward portion of the air chest in the interstices between the forward and side walls of the air chest and the side of the filter pack. Air flow reversal occurs at the bottom of the interstitial passage with downwardly flowing air being deflected along the bottom of the air chest and then passing vertically upwardly. The air then passes upward through the filter pack through successive coarse, fine particle and charcoal mist filters to the top of the air chest. Outlet at the top of the air chest occurs with the exit flow of filtered air to a side cab plenum immediately behind the operator.

2 Claims, 3 Drawing Sheets

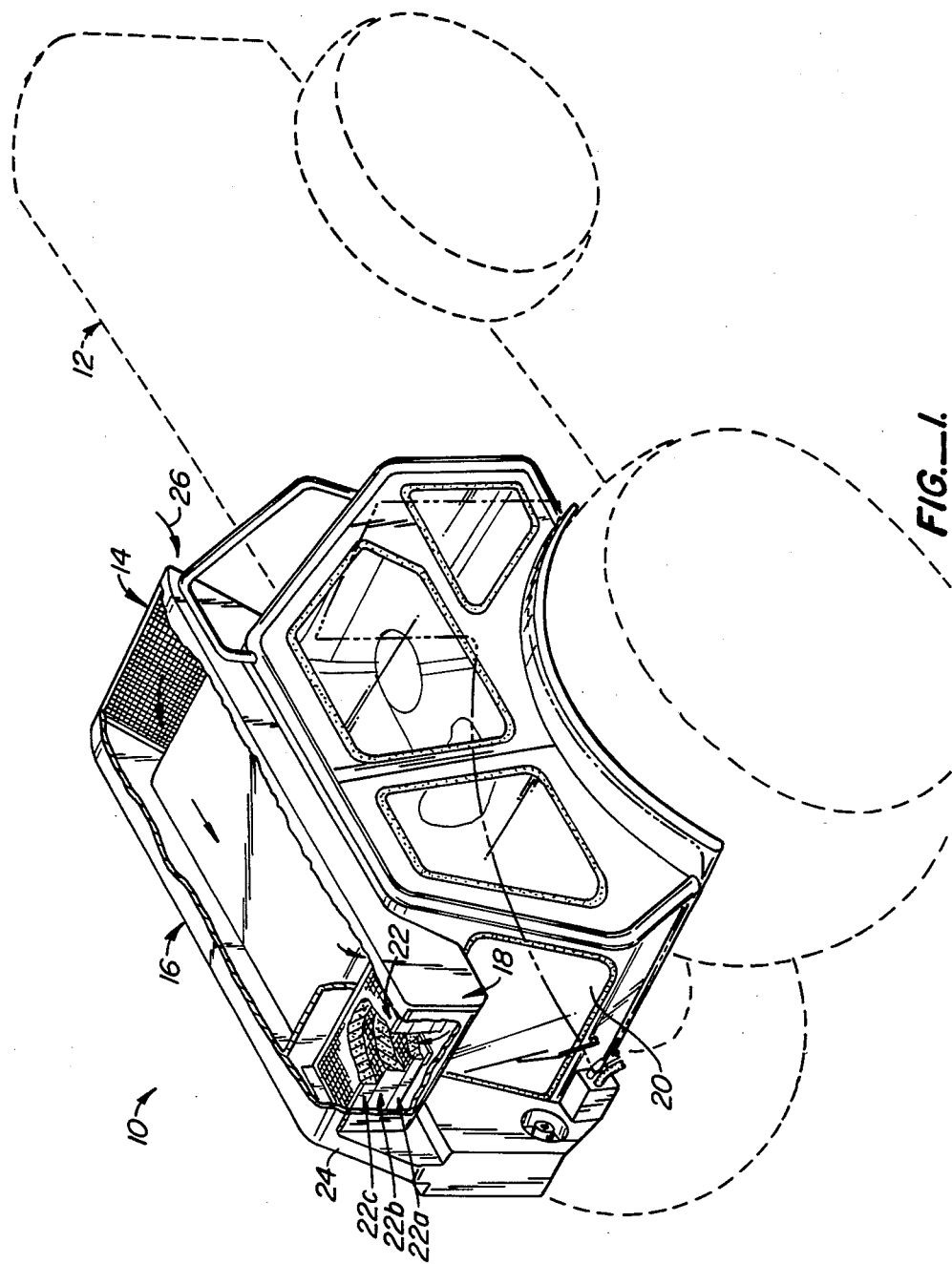
FIG.—1.

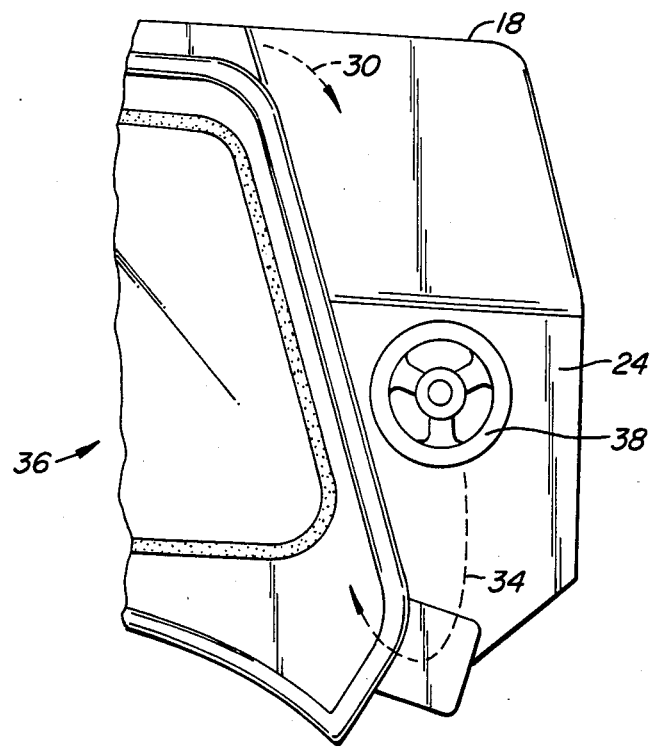
FIG._2A.
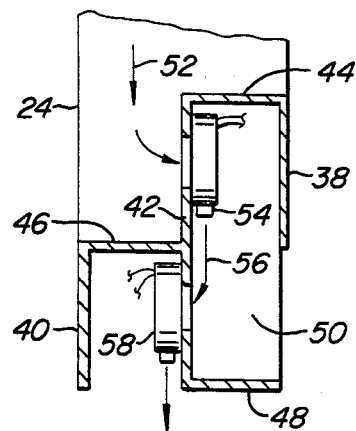
FIG._2B.

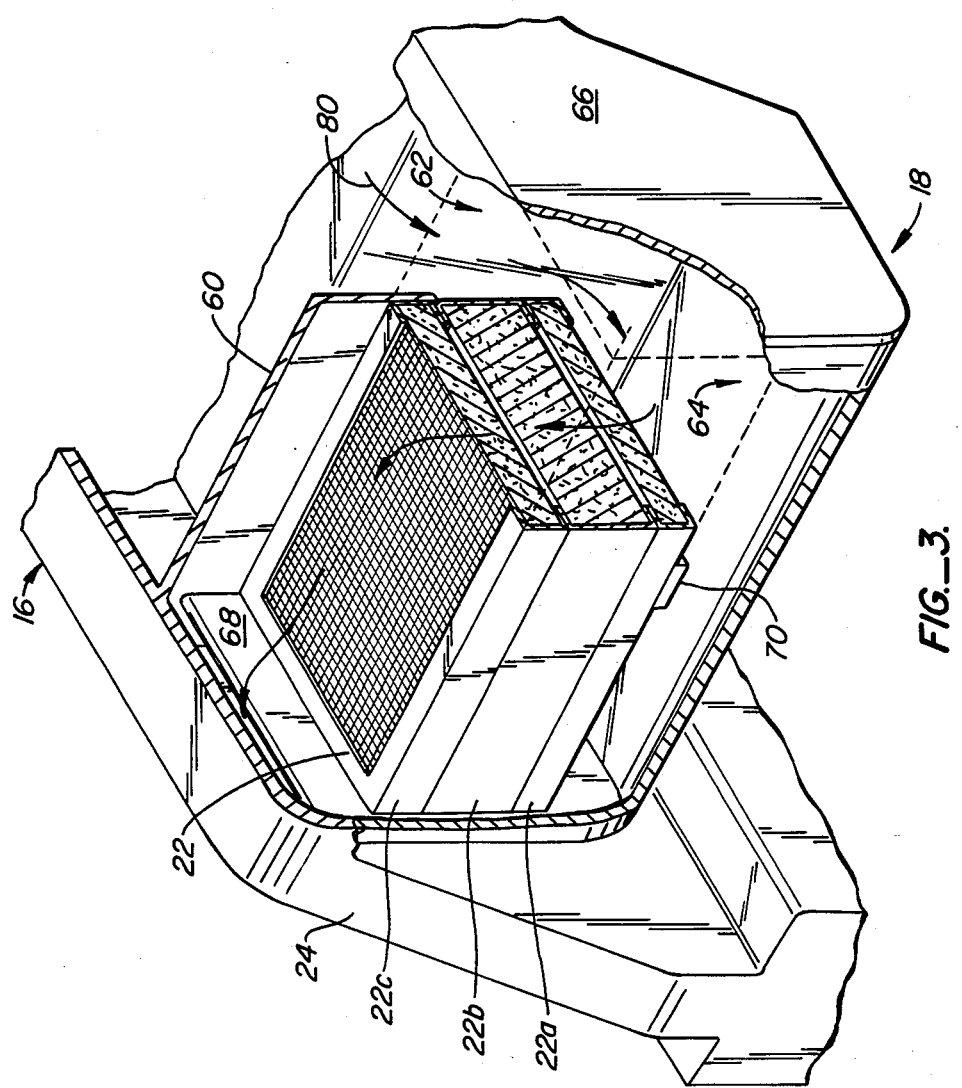
FIG._3.

FILTER SYSTEM INCORPORATED WITH CAB FOR ORCHARD SPRAYER

This invention relates to a removably attachable enclosed cabs utilized with agricultural tractors towing sprayers and more particularly to an improved air filtration system used in combination with such cabs.

SUMMARY OF THE PRIOR ART

The towing of agricultural sprayers through orchards has constituted a hazardous occupation for tractor operators. In the past, such tractor operators were equipped with rain gear and respirators to protect them from the caustic and poisonous spray utilized in orchards. Typically, the caustic and poisonous spray penetrated the rain gear, often running down the skin of the torso. Further, in frustration, workers have been known to remove the respirators.

In an attempted solution to this unacceptable working environment, removably attachable enclosed cabs for use with agricultural tractors have been utilized. In the past, such cabs have included an air chest mounted either at the top or rear of the cab.

When the air chest is mounted at the top of the cab, air intake to the air chest is typically at the top portion of the cab. Air is drawn downward through the filter pack contained in the air chest and into the cab. Unfortunately, such an air chest presents to the cab a high vertical profile. The air chest collides with branches resulting in damage to the branches, fruit, and the air chest.

More unfortunately, such an air chest rapidly has their air filters saturated. Typically, the air filters contained in the filter pack saturate with downward flowing filtered spray. The saturated air filters allow the spray to pass through the filter pack with the filtered air into the interior atmosphere of the enclosed cab. Air filter replacement, a time consuming task, is frequently required in order to protect the tractor operator from the spray. When frequent filter replacement is required, it is often ignored.

In attempts to improve this situation, cabs in the past have included an overhead air intake plenum with the air chest mounted to the upper rear portion of the cab below the cab top and immediately overlying the cab rear window. Such an air chest mounting decreases the vertical profile of the cab while placing the air chest in a position that permits necessary operator view to the rear of the tractor.

Unfortunately, such an air chess mounting continues the difficulty that frequent filter replacement is required to prevent spray particles from passing through the filter system into the interior atmosphere of the enclosed cab.

SUMMARY OF THE INVENTION

An air filtration system is disclosed in combination with a removably attachable enclosed cab for preferred use with an agricultural tractor towing a sprayer through an orchard. The enclosed cab has an air intake from the upward forward portion of the cab. The air intake opens to an intake plenum which passes along the top of the cab defining a minimum vertical profile over the top of the cab. The intake plenum delivers spray contaminated air to an air chest for filtration. The air chest is mounted to the upper rear portion of the cab below the cab top and immediately overlying the cab rear window for minimal obstruction of necessary operator view to the rear of the tractor. Air passes down the forward portion of the air chest in the interstices between the forward and side walls of the air chest and the side of the filter pack. Air flow reversal occurs at the bottom of the interstitial passage with downwardly flowing air being deflected along the bottom of the air chest and then passing vertically upwardly. The air then passes upward through the filter pack through successive coarse, fine particle and charcoal mist filters to the top of the air chest. As the filtered air passes upward through the filter pack the extracted spray particles fall downward to the bottom of the air chest. Outlet at the top of the air chest occurs with the exit flow of filtered air to a side cab plenum immediately behind the operator. Two electric blowers, connected in series, draw the filtered air downward through the side cab plenum below atmospheric pressure and discharge the filtered air to the interior of the enclosed cab above atmospheric pressure. Preferably, before entry into the cab, an air conditioning unit followed by a heater enables complete air treatment of the filtered air before discharge into the interior of the enclosed cab. There results an air chest in combination with a filter pack, which has prolonged life due to the upward flowing air through the successive air filters, providing clean air to the interior atmosphere of the enclosed cab for operator safety.

Other Objects and Advantages

An object of this invention is to disclose a filter pack disposition within an air chest which allows prolonged filter life. According to this aspect of the invention, the filter pack is mounted within an air chest so that the side walls of the filter pack, together with the side walls of the air chest, define a downflowing air plenum from the top portion of the filter pack to the bottom portion of the filter pack. The air filters, including a lower course filter, an intermediate fine particle filter and an upper charcoal mist filter, is surrounded by the air impervious side walls of the filter pack so as to permit the upward spray extracting flow of air. The filtered spray then falls downward against the air flow.

An advantage of this aspect of the invention is that the upward flowing air path prolongs the life of the filter. No longer must the filter system have its filters continually replaced.

A further advantage of this aspect of the invention is that the downflowing spray particles assist in the extraction of the upflowing spray. In short, there is a cooperative cleansing action between the downward flowing spray particles and the upward flowing unfiltered air.

A further object of this invention is to disclose in combination with the filter the filter pack a path of air flow reversal for spray particle separation from the unfiltered air stream. According to this aspect of the invention, the filter pack and air chest form a downflowing air plenum to the bottom portion of the filter pack. The downflowing air plenum in turn is reversed in flow upwardly to supply the bottom course filter with upwardly inflowing air.

An advantage of this aspect of the invention is that the air flow reversal tends to extract spray particles before the filter is reached. Such particles accumulate at the bottom portion of the air chest.

A further advantage of the disclosed air filtration system is that it incorporates positive features of prior art air filtration systems.

Specifically, the overhead air intake plenum allows air intake at the front of the cab where the air has its lowest contamination content, and maintains a low profile for streamlined passage of the cab through the orchard. At the same time, the air chest is mounted on the upper rear portion of the cab below the cab top and immediately overlying the cab rear window for minimal obstruction of necessary operator view to the rear of the tractor. The disclosed air filtration system permits suction of air under a vacuum through the filter system for optimum extraction of spray particles. Air is discharged from the system above atmospheric pressure to the interior atmosphere of the enclosed cab. This filtered and above atmospheric pressure air maintains an air barrier protecting the tractor operator from the caustic and poisonous spray immediately surrounding the enclosed cab.

Other objects, features, and advantages of this invention will become more apparent after referring to the following specification and attached drawings in which:

FIG. 1 is a perspective view of the removably attachable enclosed cab overlying a tractor (shown in broken line outline) taken from a vantage point above and behind the cab, the illustrated cab being sectioned at the overhead air intake plenum through the air chest to illustrate air passage to and through a filter pack with the path of air flow reversal being specifically illustrated;

FIG. 2A is a side view of the rear of the removably attachable enclosed cab illustrating the discharge of air from the air chest through a side cab plenum with discharge into the interior of the enclosed cab;

FIG. 2B is a front view of the side cab plenum illustrating the flow of air through tandem series connected electrical blowers with discharge into the interior atmosphere of the enclosed cab through respective air conditioning and heat exchangers; and FIG. 3 is an enlarged perspective section of the filter constituting the improvement herein.

DESCRIPTION OF THE PREFERRED EMBODIMENT

Referring to FIG. 1, a removably attachable enclosed tractor cab constructed in accordance with the teachings of the present invention, and designated generally with the reference numeral 10, is illustrated. The enclosed cab 10 is shown attached to an agricultural tractor 12.

The enclosed cab 10 has an air intake 14 at the upward forward position of the cab 10. The air intake 14 opens to an air intake plenum 16. The air intake plenum 16 passes along the top of the cab 10 to an air chest 18. The air chest 18 is mounted to the upper rear portion of the cab 10 below the cab top and immediately overlying the cab rear window 20. The air chest 18 contains a filter pack 22 with successive course *22a*, fine particle *22b*, and charcoal mist *22c* filters. The top of the air chest 18 opens into a side cab plenum 24. In use, exterior unfiltered air 26 is drawn through the air intake 14 through the air intake plenum 16, into the air chest 18, through the filter pack 22, and into the side cab plenum 24.

FIG. 3 illustrates in more detail the flow of unfiltered air into the air chest 18, through the filter pack 22, and into the side cab plenum 24.

The air chest 18 has air-impervious walls including a deflector plate 60, a chest front wall 62, chest side walls 66 and 68, and a chest floor 64. The filter pack 22 is positioned in the air chest 18, on a projecting support beam 70, above the chest floor 64, and against the deflector plate 60. When the filter pack is properly positioned, the filter pack is the only air passage between the interstitial passage below the filter pack and the interstitial passage above the filter pack. Also, the side of the filter pack 22 acts as an extension of the deflector plate 60.

In use, the unfiltered air 80 is drawn into the air chest 18 from the intake air plenum 16. The unfiltered air 80 is then deflected downward by the deflector plate 60 and by the side of the filter pack 22. The unfiltered air 80 is deflected into an interstitial passage between the filter pack and the chest front wall 62. The unfiltered air is drawn downward until it reaches the interstitial passage beneath the filter pack and above the chest floor 64. The downflowing unfiltered air is then deflected upward by the chest floor into the filter pack. This air flow reversal causes some spray particle separation from the unfiltered air.

The air is then drawn upward through the successive course *22a*, fine particle *22b*, and charcoal mist filter *22c*. As the air passes through the successive filter, the caustic and poisonous spray is filtered from the air. The filtered spray then falls downward, against the flow of air, into the interstitial passage below the filter pack. As the filtered spray falls downward against the upward flowing air, it assists in the extraction of the upflowing spray.

The filtered air is then drawn from the filter pack into an interstitial passage above the filter pack. The air then passes through an opening in the chest side wall 68 into the side cab plenum 24.

FIG. 2A illustrates the air chest 18 with air flow 30 through the side cab plenum 24 with removable cover 38 where the air flow 34 continues into the interior of the enclosed cab 36.

FIG. 2B illustrates the side cab plenum 24 with removable covers 38 and 40. The side cab plenum 24 has a partitioning wall 42 and obstructions 44, 46, and 48 constructing a baffle 50. The air flow 52 is pulled into the baffle 50 by an upper electrical fan 54. The air flow 56 is then pushed out at the baffle 50 by a lower electrical fan 58 into the lower portion of the side cab plenum 24.

What is claimed is:

1. In a removably attachable enclosed cab for an agricultural tractor having an overhead air intake plenum for drawing air from the forward upper portion of the cab, an air chest mounted on the upper rear portion of said cab below the vertical profile of said cab overlying the rear window of said cab, said air chest including air impervious side walls and at least one air impervious top wall and an air impervious bottom wall for confining air flow through said air chest; means communicating said plenum to the upper portion of said air chest, a filter pack placed within said air chest for filtering air passing from said overhead air intake plenum to the interior of said cab, said filter pack having vertically disposed air impervious side walls defining a central passage through said filter pack; and a blower system for drawing air below atmospheric pressure through said air chest and discharging air above atmospheric pressure to the interior of said cab to maintain an operator in said cab within an enclosed volume of filtered air, the improvement in said filter chest comprising:

a plate means in said air chest connected to the top wall of said air chest for mounting said filter pack adjacent one of said air impervious side walls of said air chest and in spatial separation from one of said side walls of said air chest to define from said air intake plenum along a side wall of said filter pack a downward passage to the bottom of the filter pack for the passage of unfiltered air;

support means for mounting said air filter pack in spatial separation above the bottom of said air chest for defining a lower entry passage of air into and for upward flow interiorly of said filter pack whereby air flow reversal occurs from the downflow to the bottom of the filter pack to the upflow through the filter pack; and said air filter pack and plate means above said filter pack defining a discharge path under suction to said blower system for drawing said air below atmospheric pressure through said filter pack and discharging air above atmospheric pressure to said cab.

2. An improved removably attachable enclosed cab for an agriculture tractor comprising:

an overhead air intake plenum for drawing air from the forward portion of said cab;

an air chest mounted on the upper rear portion of said cab below the vertical profile of said cab overlying the rear window of said cab, said air chest including air impervious side walls and at least one air impervious top wall and air impervious bottom wall for confining air flow through said air chest;

means for communicating said plenum to the upper portion of said air chest;

a filter pack placed within said air chest for filtering air passing from said overhead air intake plenum to the interior of the cab, said filter pack having air impervious vertically extending side walls defining a central vertical passage through said filter pack;

a blower system for drawing air below atmospheric pressure through said filter pack and discharging air above atmospheric pressure to the interior of said cab to maintain an operator in said cab within an enclosed volume of filtered air;

plate means in said air chest connected to the top wall of said air chest for mounting said filter pack adjacent one of said air impervious side walls of the air chest and in spatial separation from said side walls of said air chest to define from one of said air intake plenum along a side wall of said filter pack a downward passage to the bottom of the filter pack for the passage of unfiltered air;

support means for mounting said air filter pack in spatial separation above the bottom of said air chest for defining a lower entry passage of air into and for upward flow interiorly of said filter pack whereby air flow reversal occurs from the downward to the bottom of the filter pack to the upflow through the filter pack; and said air filter pack and plate means defining above said filter pack a discharge path under suction to said blower system for drawing said air below atmospheric pressure through said filter pack and discharging air above atmospheric pressure to said cab.

* * * * *